June 12, 1923.
C. S. CUNNINGHAM ET AL
COUPLING
Original Filed March 28, 1919
1,458,395
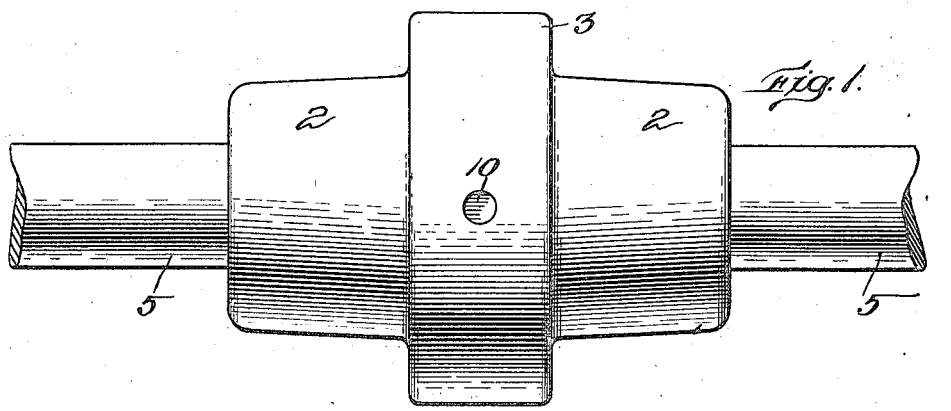
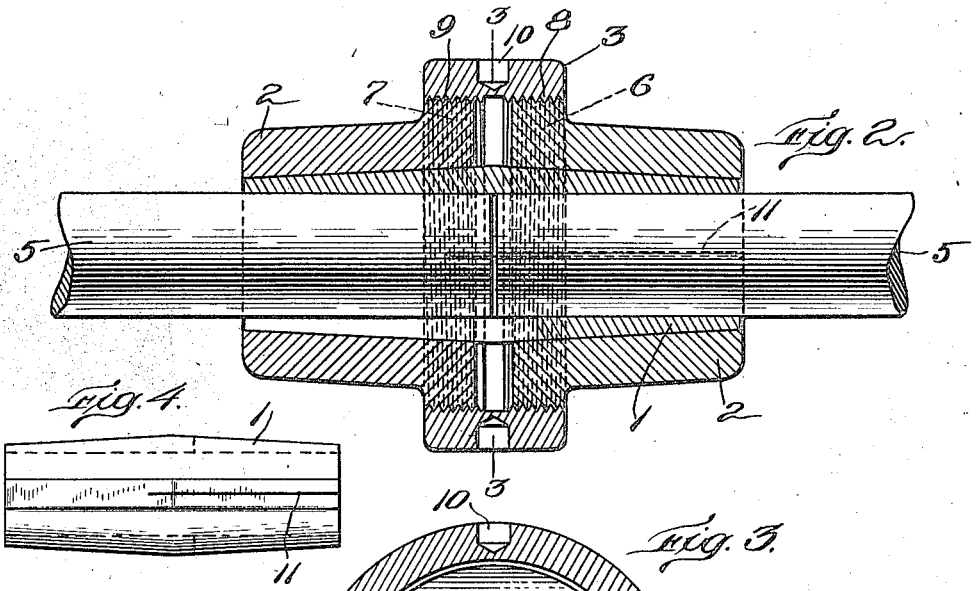
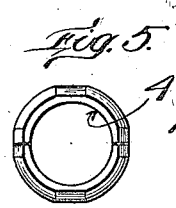
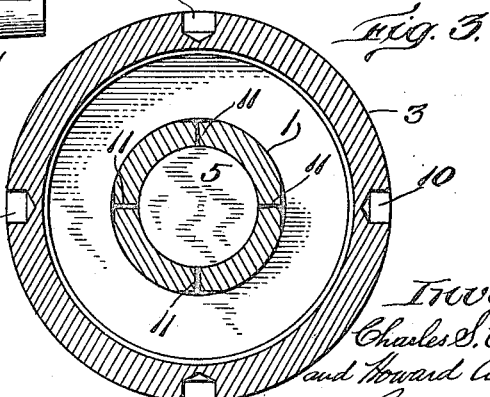

Patented June 12, 1923.

1,458,395

UNITED STATES PATENT OFFICE.

CHARLES S. CUNNINGHAM AND HOWARD A. BURDWOOD, OF LYNN, MASSACHUSETTS.

COUPLING.

Application filed March 28, 1919, Serial No. 285,316. Renewed February 26, 1923.

*To all whom it may concern:*

Be it known that we, CHARLES S. CUNNINGHAM and HOWARD A. BURDWOOD, both citizens of the United States, residing at Lynn, in the county of Essex and State of Massachusetts, have invented certain new and useful Improvements in Couplings, of which the following is a specification.

Our invention relates to couplings for shafts, rods and the like, and it has for its object to improve the construction of devices of this kind.

Couplings of the class referred to have heretofore included in their construction a split exteriorly tapered sleeve, that is, a sleeve tapered from its middle toward each end, said sleeve surrounding the two ends of the shafts or rods that are to be coupled together, and being contracted so as to grip and connect the ends of said shafts, by means of two flanged clamping members mounted on the sleeve and drawn together by a plurality of bolts extending through the flanges of said clamping members. The objections to a coupling of this kind were that it was comparatively large in diameter thus requiring a considerable amount of room; it was heavy, and required a comparatively great number of parts so that it was expensive to build. Moreover, with such constructions it was necessary to apply considerable force to the two clamping members, by means of the bolts, in order to cause the split sleeve to securely grip and connect the two shafts owing to the character of the engagement of said members with the sleeve, and because of this engagement it was also difficult to separate said two members when dis-assembling the coupling.

Our invention aims to obviate the above noted objectionable features and to provide an improved coupling of simple, efficient and inexpensive construction.

To these ends our invention consists of a coupling for shafts, rods and the like, having the peculiar features of construction set forth in the following description and particularly pointed out and defined in the claims at the close thereof.

In the accompanying drawings:

Figure 1 is an elevation of my improved coupling showing the same as applied to the ends of two shafts.

Figure 2 is a central longitudinal sectional view of the coupling shown in Fig. 1.

Figure 3 is a section on line 3—3 of Fig. 2.

Figure 4 is an elevation of the tapered sleeve hereinafter described.

Figure 5 is an end view of the sleeve shown in Fig. 4.

Our improved coupling, in its best form, comprises but four parts, viz., a split sleeve 1; a pair of sleeve clamping members 2, and a member operating and holding nut 3. The sleeve 1 is made with a cylindrical bore 4 of a diameter to freely receive the ends of two rods or shafts 5, 5, and is also exteriorly tapered from its middle toward each end. In order to provide for contraction of sleeve 1 onto the two shafts 5, said sleeve is slotted longitudinally as at 11, there being a pair of diametrically opposite slots at each end of the sleeve extending from said end to a point just beyond the middle of the sleeve with the pair of slots at one end of the sleeve disposed at right angles to the pair at the opposite end. The tapered or conical end portions of sleeve 1 receive upon them the clamping members 2 each of which is formed with a tapered bore whose smaller diameter is approximately the same as the diameter of the end of the sleeve 1. Also, each clamping member 2 is of slightly less length than its half of the sleeve so that a space is left between the inner ends of said members. At its inner end one of the members 2 is formed upon its exterior with a right hand thread 6 while the inner end of the other member is formed upon its exterior with a left hand thread 7.

The nut 3 is interiorly threaded as at 8 and 9 with right and left hand threads cooperating, respectively, with the threads 6 and 7 of clamping members 2. Upon its exterior the nut 3 is made with sockets 10 to adapt said nut to be engaged by a spanner wrench by means of which it is rotated.

The coupling is set up as follows:—After placing the sleeve 1 in position telescoping the ends of both shafts 5 and sliding the two members 2 onto the ends of the sleeve with the nut 3 between them, the latter is engaged with the threads 6 and 7 and rotated in a direction to screw onto said members 2 thus forcibly drawing the latter together and causing them to contract and clamp the sleeve 1 onto both of the shafts 5 thereby securely coupling the latter together. In order to reduce the amount of friction between members 2 and sleeve 1 while being forced together in this fashion the sleeve is flattened longitudinally upon its exterior as shown so as to provide said exterior with alternating high and low portions extending from end to end of the sleeve, the high portions or ribs only being engaged by the interior surfaces of the clamping members 2. This peculiar formation of the exterior of the sleeve also prevents the clamping members 2 and sleeve 1 from sticking or "freezing" together through rusting of the parts, to the extent that has heretofore been the case. But it will now be clear that even with the parts of our improved coupling stuck firmly together, either because of frictional engagement between the parts, or because of rust, rotation of nut 3 in the reverse direction to that just described will forcibly shove the two clamping members 2 apart. Thus in our improved coupling the means for forcing the members 2 into sleeve clamping position also serves as means for forcing said two members apart to unclamp the sleeve. Our improved coupling is of simple, efficient and inexpensive construction. Furthermore, the flat surfaces provided upon the sleeve not only make the operation of setting the coupling easier than would be the case without such surfaces, but they enable us to construct the sleeve with very little taper which gives comparatively great clamping action when the nut is set up tight. A further advantage to the construction above described is that the tapered bores fitting upon the oppositely tapered sleeve clamp the latter to the two shafts in such manner that said shafts are perfectly alined.

What we claim is:

1. A coupling of the character described having in combination, a split sleeve adapted to telescopically overlap the ends of two shafts or the like, said sleeve being exteriorly tapered from near its middle toward each end and being formed non-circular in cross-section so as to provide its exterior with longitudinal flat faces alternating with longitudinal elevations; a pair of clamping members mounted upon said sleeve, and engaging only the longitudinal elevations thereof, and means for forcing said members together to contract said sleeve onto said shafts.

2. A coupling of the character described having in combination, a split sleeve adapted to telescopically overlap the ends of two shafts or the like, said sleeve being exteriorly tapered from near its middle toward each end and being formed non-circular in cross-section so as to provide its exterior with longitudinal depressions alternating with longitudinal segmental ribs; a pair of clamping members mounted upon said sleeve and engaging only the longitudinal elevations of the latter, one of said members being threaded exteriorly in a right hand direction and the other of said members being threaded exteriorly in a left hand direction, and a nut formed interiorly with right and left hand threads co-operating with the threads upon the exteriors of said clamping members to force the latter together or apart, said nut being formed upon its outer side with one or more spanner wrench sockets.

3. A coupling of the character described having, in combination, a sleeve adapted to receive within it the ends of two shafts, said sleeve being exteriorly tapered from a relatively large diameter near its middle toward each end and formed with two pairs of longitudinal slots, one of said pairs of slots being at each end of the sleeve and extending from said end to near the middle of the sleeve with the pair of slots at one end angularly spaced ninety degree from the pair of slots at the opposite end of said sleeve, and the exterior of said sleeve being formed with relatively narrow longitudinal flattened surfaces coinciding with said slots; a pair of sleeve clamping members mounted upon said sleeve, and means for drawing said members together to cause them to contract said sleeve on to said shafts.

In testimony whereof we have affixed our signatures.

CHARLES S. CUNNINGHAM.
HOWARD A. BURDWOOD.